May 5, 1931.  K. S. M. DAVIDSON  1,803,842
GAUGE GLASS MOUNTING
Filed July 13, 1929

Witness
Jas. J. Maloney

Inventor
Kenneth S. M. Davidson
by his Attorneys
Van Buren Fish Hildreth & Cary

Patented May 5, 1931

1,803,842

UNITED STATES PATENT OFFICE

KENNETH S. M. DAVIDSON, OF NEWTON HIGHLANDS, MASSACHUSETTS, ASSIGNOR TO CROSBY STEAM GAGE & VALVE CO., OF BOSTON, MASSACHUSETTS, A CORPORATION OF MASSACHUSETTS

GAUGE GLASS MOUNTING

Application filed July 13, 1929. Serial No. 377,967.

The present invention relates to a new and improved form of construction for supporting and mounting the transparent front of a gauge in a manner to seal the interior of the gauge from dust and dirt.

Figure 1:
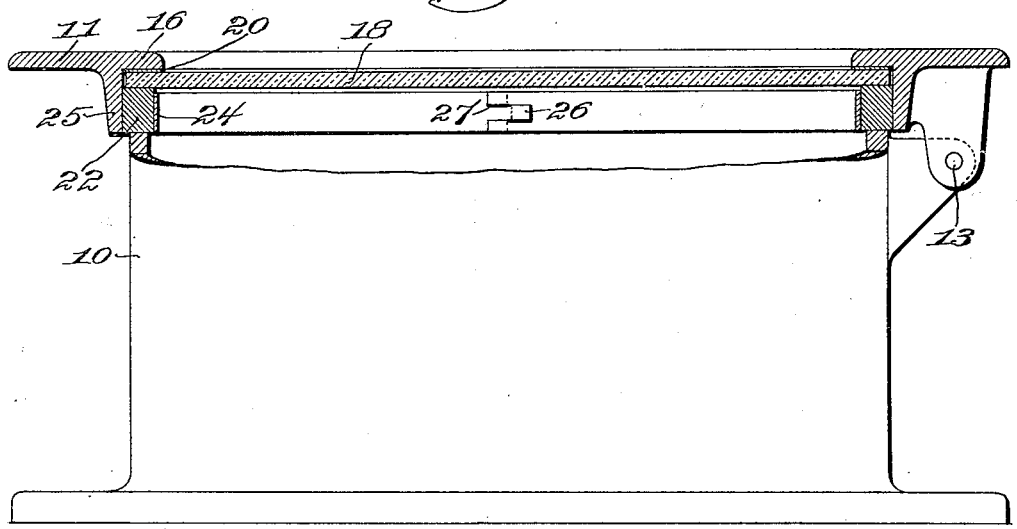
Figure 2:
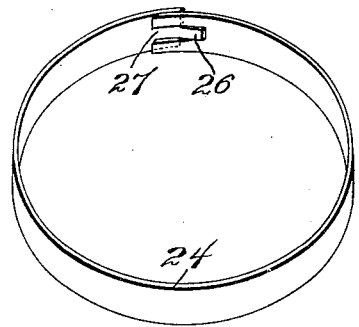

In the accompanying drawings illustrating the preferred form of the invention,

Fig. 1 represents a section in elevation of a gauge with the improved mounting in position; and Fig. 2 is a detail illustrating a view of the metallic locking ring adapted to hold the rubber gasket in place.

The gauge shown in the illustrated embodiment of the invention comprises the usual casing 10 having a cover portion or ring 11 hinged thereto at 13. The ring has an inwardly extending flange 16 adapted to project over the front portion of a gauge glass 18, and retain the latter in place. Interposed between the glass and the flange may be a gasket 20 of paper or similar material. The gauge glass is yieldingly maintained in contact with the inwardly extending flange by a yielding gasket or ring 22, preferably of rubber. This ring, as indicated in Fig. 1, is substantially rectangular in cross-section, bears upon the under face of the glass at the periphery, and yieldingly forces the glass against the flange 16 through the provision of a resilient locking band or ring 24 which is preferably made in the form of a split steel ring having tongue and groove connections indicated respectively at 26 and 27 at opposite ends. This steel band when in place compresses the rubber gasket, and maintains the gasket in yielding engagement with the gauge glass. Furthermore, the band maintains the rubber gasket in tight sealing engagement with the surrounding rim 25 of the cover 11. When the cover of the gauge is closed, as indicated in Fig. 1, the rubber gasket rests upon the edge of the casing 10 and maintains a sealing engagement between the cover and casing.

It will be evident that broken gauge glass may be readily replaced with this construction by removing the clamping ring, the rubber gasket 22, replacing the broken gauge glass, and thereafter assembling the parts.

What is claimed is:

An instrument glass mounting comprising a removable rim, a glass assembled within the rim, an inwardly extending flange projecting partially across the front portion of the glass, a sealing ring of flexible material assembled within the rim behind the glass and loosely fitting the rim, and a resilient band assembled within the sealing ring and serving through its normally expansive tendency to distort the ring in two directions, thus maintaining the glass in sealing engagement with the flange in addition to sealing the rim directly through the ring.

KENNETH S. M. DAVIDSON.